A. STEVENS.
PROCESS OF SEPARATING PARTLY MISCIBLE COMPOUNDS.
APPLICATION FILED MAR. 10, 1920.
1,394,232. Patented Oct. 18, 1921.
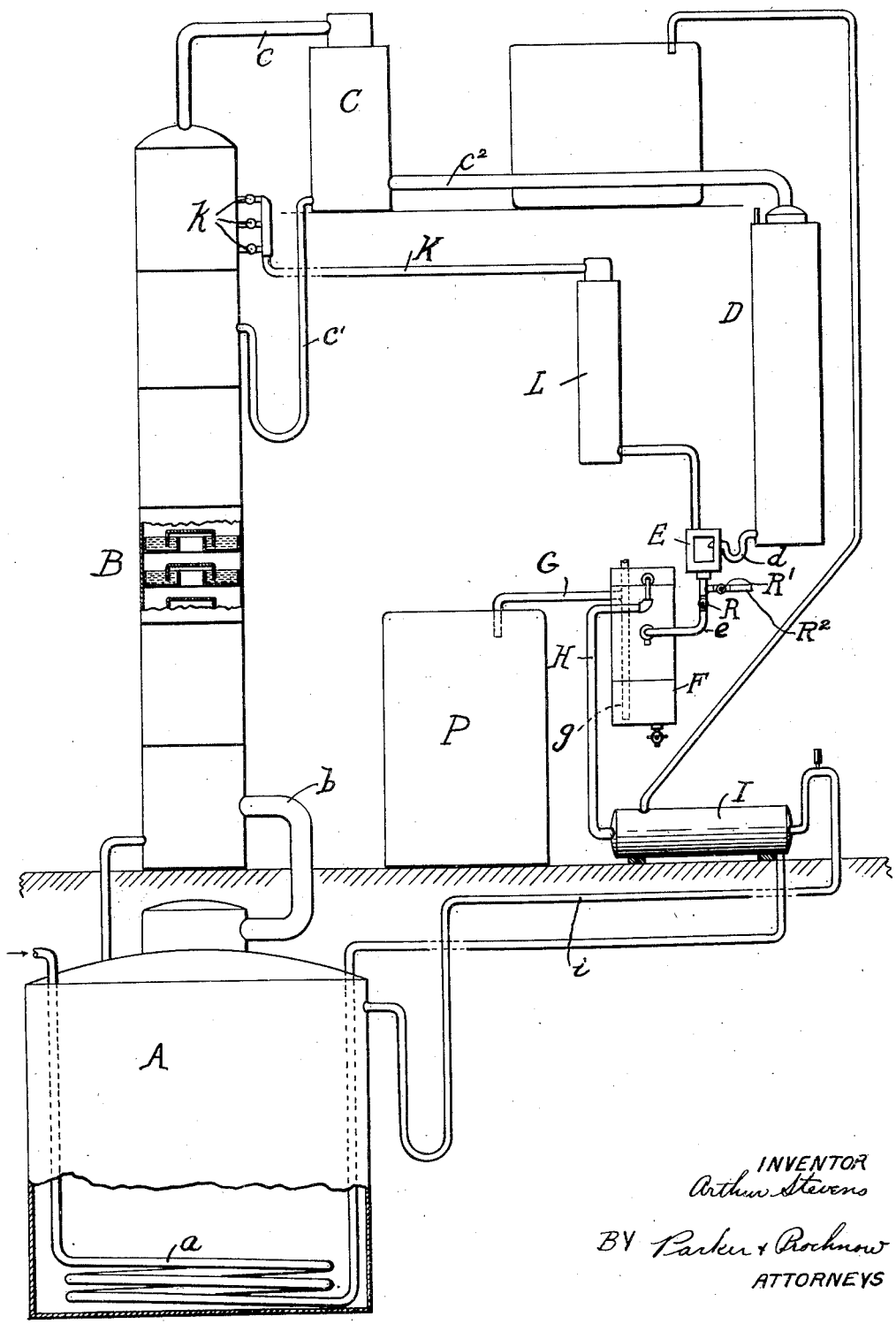
INVENTOR
Arthur Stevens
BY Parker & Rochnow
ATTORNEYS

UNITED STATES PATENT OFFICE.

ARTHUR STEVENS, OF BUFFALO, NEW YORK.

PROCESS OF SEPARATING PARTLY MISCIBLE COMPOUNDS.

1,394,232.   Specification of Letters Patent.   Patented Oct. 18, 1921.

Application filed March 10, 1920. Serial No. 364,697. REISSUED

*To all whom it may concern:*

Be it known that I, ARTHUR STEVENS, a citizen of the United States, residing at Buffalo, in the county of Erie and State of New York, have invented a new and useful Improvement in Processes of Separating Partly Miscible Compounds, of which the following is a specification.

This invention relates to processes of separating partly miscible, constant boiling point compounds by means of distillation. It is well known that with certain compounds which are partly miscible with other compounds the mixture of compounds has a boiling point which is lower than the boiling point of either compound. The separating of materials of this kind, consequently involves considerable difficulty.

The objects of this invention are to provide a process whereby materials of this kind can be separated by distillation in a continuous process whereby one of the compounds is removed from the distillate and the remainder of the distillate is returned continuously to the still, so that after a certain length of time the material remaining in the still will be entirely freed from one of the compounds.

The accompanying drawing shows diagrammatically an apparatus by means of which this process can be carried out.

In the following description the process will be described as applied to the separation of water from butyl alcohol, but it will be understood that this process can be used in connection with the separation of any other partly miscible compounds in which the mixture has a boiling point lower than the boiling points of either of the compounds.

A represents a still or kettle of the kind commonly used in connection with distilling apparatus, and to which the necessary heat is supplied by means of a steam coil $a$, and B represents the usual rectifying column into which the vapor from the still is conducted by means of a pipe $b$. The vapor, after passing through the rectifier, enters by means of a pipe or passage $c$ into a partial condenser C, from which the compounds having the highest boiling points are returned by means of a pipe $c'$ to the rectifying column B and the remaining vapors are conducted by means of a pipe $c^2$ to a second condenser D. All of these parts have heretofore been used in connection with distilling apparatus, and the part of the process involving the use of this apparatus is not novel.

In the use of this portion of the apparatus the still or kettle A is charged with a mixture of butyl alcohol and water which contains approximately 20 per cent. of water and 80 per cent. of butyl alcohol, the greater part of which has a boiling point of about 90° C. The vapor which is discharged from the still upon boiling the liquid in the still contains a constant boiling point vapor consisting of approximately 30 per cent. water and 70 per cent. butyl alcohol boiling at 90° C., and a quantity of pure butyl alcohol vapor having a higher boiling point. The functions of the rectifying column B and the partial condenser C are to condense the pure butyl alcohol vapor and to return it to the still A, thus allowing the constant boiling point mixture to pass into the final condenser D where all the remaining vapor is condensed, forming again a liquid containing butyl alcohol and water, but which contains a larger percentage of water than the liquid in the still. This mixture separates on standing as the butyl alcohol and water are not miscible in the proportions in which they are present in this mixture. The liquid from the condenser D flows through a pipe $d$ through a sight box E where the color and flow of the liquid can be observed. From the sight box the liquid flows through a pipe $e$ to a separator F. The liquid reaching the separator will contain partly a mixture of approximately 20 per cent. water and 80 per cent. butyl alcohol which is the saturation point for butyl alcohol and water, and also a quantity of excess water which is not mixed with butyl alcohol but which distils over with it because of the constant boiling point compound formed. This water contains a small quantity of butyl alcohol, approximately 4 per cent., and will collect in the bottom of the separator F, and the mixture of approximately 20 per cent. water and 80 per cent. butyl alcohol will collect in the separator F above the other liquid, which is mostly water. In order to effect a continuous separation of the two liquids in the separator, a pipe G is provided having a portion $g$ extending into proximity to the bottom of the separator and the other end of which discharges the water to a suitable tank or the like P. This mixture of butyl alcohol and water is drawn off from the top of the separator by means of a pipe H which can be adjusted to the desired height and which conducts the mixture of butyl alcohol and water to a preheater tank I. In this tank the liquid is preferably heated by means of the steam discharged from the steam coils a in the still A, and this mixture in the tank I, which contains approximately 20 per cent. water and 80 per cent. butyl alcohol is returned to the still A through a pipe i. The returning of the alcohol from the separator F through the preheater to the still gradually increases the percentage of butyl alcohol in the still until all the water has been removed and this continuous procress saves a large amount of labor and handling of material.

The process of distillation is carried on continuously until practically all of the water has been removed from the butyl alcohol, at which time the temperature of the vapor in the upper portion of the rectifying column B will be approximately 117° C., namely the boiling point of butyl alcohol. When pure butyl alcohol passes through the sight box E, the liquid will be seen to be clear, the mixture of butyl alcohol and water being cloudy, due to the presence of free water particles in the mixture. When, therefore, the temperature at the head of the rectifying column or the appearance of the stream of liquid in the sight box indicates that the contents of the still are substantially pure butyl alcohol, any one of a number of valves k at the top of the rectifying column may be opened, thus permitting pure butyl alcohol to flow through the pipe K into the cooler L. By closing a valve R in the pipe e, shutting off the flow of liquid to the separator F, and opening a valve R' in a discharge pipe R², the pure butyl alcohol may be allowed to flow from the apparatus through the pipe R².

By means of this process the separation of any two partly miscible compounds, which when mixed have a boiling point lower than the boiling point of either compound, is greatly simplified since the process requires very little attention and practically no handling of material is necessary. When the apparatus is charged and the tubes in the separator are adjusted to separate the desired compounds the process will be carried on with practically no attention until all of one compound has been separated, after which the remaining compound is distilled from the apparatus as described and a new charge is placed in the still. This process greatly reduces the cost of separation of compounds of this kind. The continuous process utilizes very efficiently the heat in the steam by means of the preheater in which the mixture is heated before being returned to the still.

I claim as my invention:

1. The hereindescribed process of separating partly miscible constant boiling point compounds, consisting of distilling a mixture of the compounds thereby producing a distillate containing a mixture of said compounds and an excess of one of said compounds, separating said compound from said mixture, and returning said separated mixture to the mixture which is being distilled.

2. The hereindescribed process of separating partly miscible compounds which when mixed have a lower boiling point than that of either compound, consisting of condensing the vapor produced on boiling the mixture, thereby producing a liquid containing a mixture of said compounds and an excess of one of said compounds, separating said compound from said mixture, and continuously returning said separated mixture to the mixture which is being distilled.

3. The hereindescribed process of separating partly miscible compounds which when mixed have a lower boiling point than that of either compound, consisting of condensing the vapor produced on boiling the mixture, thereby producing a liquid containing a mixture of said compounds and an excess of one of said compounds, permitting said liquid to separate by decantation, continuously removing said excess of one of said compounds from said liquid and returning said mixture to the mixture which is being vaporized.

4. The hereindescribed process of separating partly miscible compounds which when mixed have a lower boiling point than that of either compound, consisting of condensing the vapor produced on boiling the mixture thereby producing a liquid containing a mixture of said compounds and an excess of one of said compounds, continuously separating said compound from said mixture by decantation, and continuously returning said separated mixture to the mixture which is being distilled.

5. The hereindescribed process of separating partly miscible compounds which when mixed have a lower boiling point than that of either compound, consisting of condensing the vapor produced on boiling the mixture thereby producing a liquid containing a mixture of said compounds and an excess of one of said compounds, separating said compound from said mixture, heating said separated compound, and returning said separated compound to the mixture which is being distilled.

6. The hereindescribed process of separating partly miscible compounds which when mixed have a lower boiling point than that of either compound, consisting of condensing the vapor produced on boiling the mixture thereby producing a liquid containing a mixture of said compounds and an excess of one of said compounds, separating said compound from said mixture, preheating said separated compound with the heating medium which has been used for boiling said first mentioned mixture, and returning said separated mixture to said still.

Witness my hand this 8th day of March, 1920.

ARTHUR STEVENS.

Witnesses:
F. E. PROCHNOW,
M. J. PITMAN.